April 4, 1961 W. T. HARRIS 2,978,671
ELECTRODYNAMIC TRANSDUCER
Filed Aug. 11, 1951 2 Sheets-Sheet 2
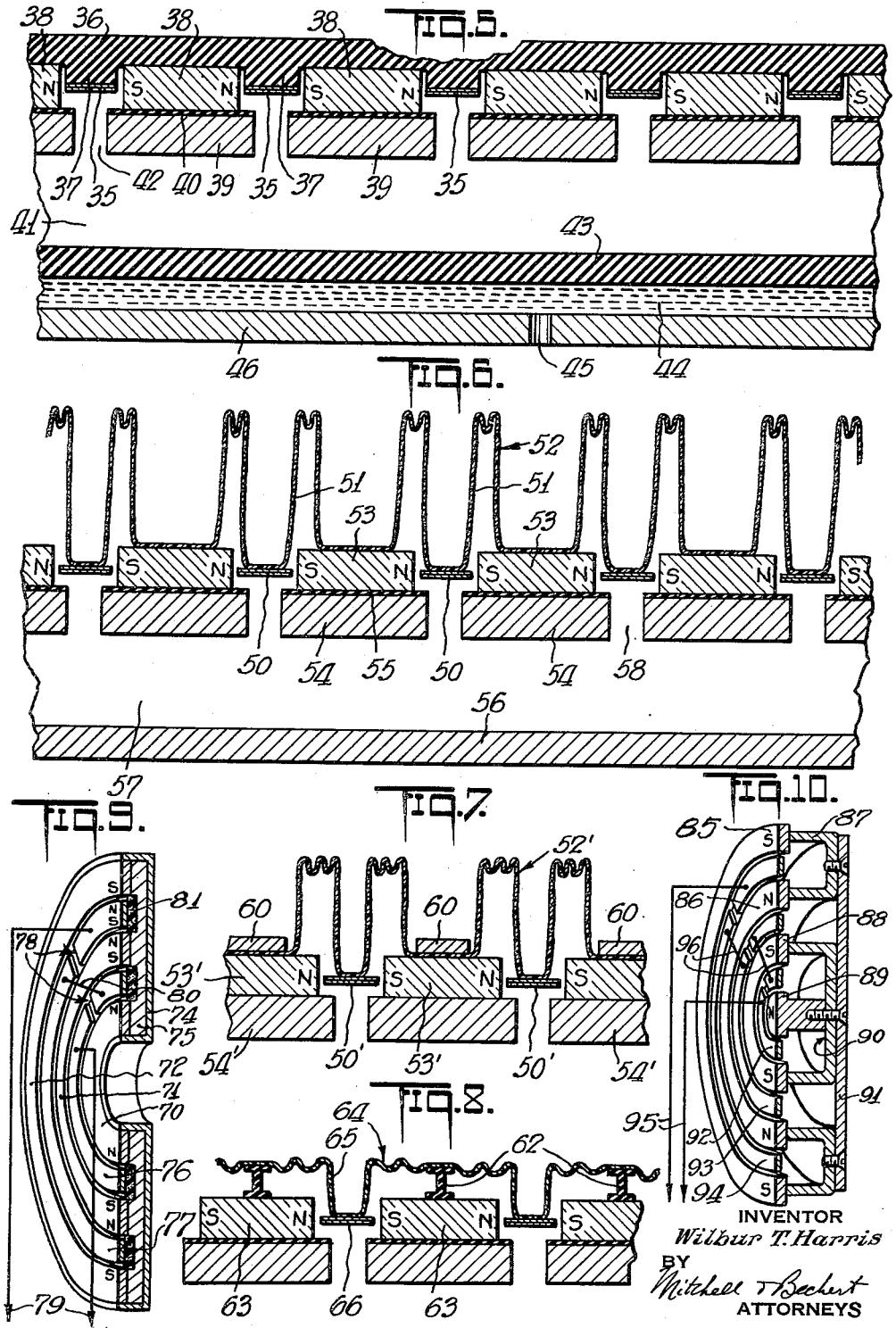
INVENTOR
Wilbur T. Harris
BY
Mitchell & Bechert
ATTORNEYS United States Patent Office 2,978,671
Patented Apr. 4, 1961

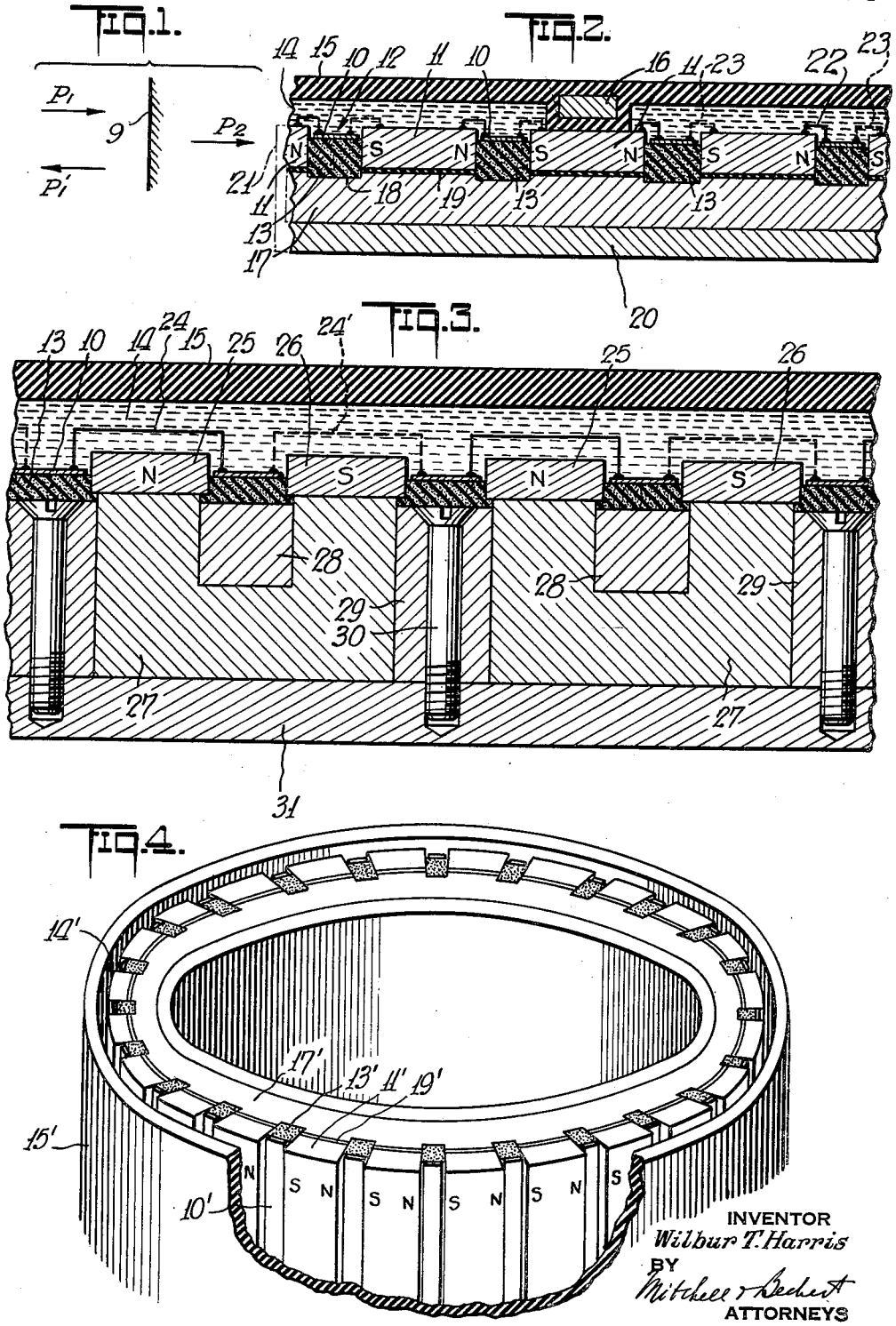

2,978,671
ELECTRODYNAMIC TRANSDUCER

Wilbur T. Harris, Southbury, Conn., assignor to The Harris Transducer Corporation, Southbury, Conn., a corporation of Connecticut Filed Aug. 11, 1951, Ser. No. 241,470

22 Claims. (Cl. 340—12)

My invention relates to electroacoustic transducers, and in particular to transducers suited to underwater operation.

Underwater transducers for the sonic range usually have efficiencies in the order of one-tenth to one percent, if they have substantially uniform response over a broad frequency range; they usually have efficiencies of five to fifty percent, if they are resonant, and this high efficiency is restricted to a frequency range in the order of one-tenth of an octave. Thus, the broad-band transducers are useful normally for receiving sound, where their low efficiency is not a great handicap, but are useless for high-power transmission. The resonant devices, on the other hand, are not versatile; they fail when broad frequency bands are to be transmitted, and a great multiplicity of transducers is required for different applications. Underwater sonic (sonar) transducers having efficiencies even as high as ten percent over an octave of frequency range would have been extremely welcome in the past.

The problems of transducer design can be discussed broadly in terms of the following equation:

$$\dot{x} = -\frac{P(t)}{R + j\omega M - \dfrac{jk}{\omega}} \quad (1)$$

where $\dot{x}$ is the velocity of the radiating transducer surface in contact with the acoustic medium, $P(t)$ is the time-variable force developed by the transducer due to externally applied power, $R$ is the resistance of the medium plus the mechanical friction and hysteresis of the device, $M$ is the mass reactance of the medium plus the mass of the moving parts of the transducer, $k$ is the stiffness of the moving parts of the transducer, and $\omega$ is $2\pi$ times the frequency.

In the usual underwater-sound transducer, the ruggedness, strength, and volume of material required for developing large forces leads to a device which is relatively massive and stiff. Thus, at all frequencies either the mass or stiffness-reactance terms in the denominator are large compared to R. At resonance, these terms are equal in magnitude and hence cancel, leaving R as the term which limits the developed motion. Since R can usually be made largely radiative, this leads to a highly efficient device at resonance if the energy conversion mechanism contained in $P(t)$ is efficient. Hence, under resonant conditions, the device is resistance-limited, and to a large degree, radiation-limited—the ideal condition. At frequencies below the resonant frequency, the stiffness term is much greater than the others, and the device is said to be stiffness limited; above resonance the device is mass-limited. Under mass or stiffness limitation, the force $P(t)$ must be greatly increased to obtain the same amount of motion as can be obtained at resonance. The losses in the electromechanical coupling mechanisms are increased in the same proportion, and hence the efficiencies actually attained under reactance-limited conditions are usually low.

It is, accordingly, an object of the invention to provide an improved transducer of the character indicated.

It is another object to provide a transducer having high efficiency over an extended frequency range.

It is a further object to provide an improved non-resonant transducer.

Another object is to provide an improved, relatively highly efficient transducer for electroacoustic or acousto-electric conversion in water and having further useful application in air.

More specifically, it is an object to provide an underwater sonic transducer construction in which R can be largely radiative and can be comparable to $\omega M$ in magnitude for a relatively wide frequency range.

Also specifically, it is an object to provide an underwater transducer in which stiffness can be negligible.

It is a general object to provide a transducer construction approaching the ideal of maintaining resistance limitation, and hence efficient broad-band performance, achieving these results with high power-handling capacity, large active area, ruggedness, and advantageous coupling to the medium.

Other objects and various further features of novelty and invention will be pointed out or will occur to those skilled in the art from a reading of the following specification in conjunction with the accompanying drawings.

In the drawings, which show, for illustrative purposes only, preferred forms of the invention—

Fig. 1 is a diagram useful in explaining the principle of operation;

Fig. 2 is a fragmentary, cross-sectional view of an underwater transducer, incorporating features of the invention;

Fig. 3 is a fragmentary view of an alternative underwater transducer construction;

Fig. 4 is a partial isometric view, partly broken away, and illustrating a modified form of the construction of Fig. 2;

Fig. 5 is a fragmentary cross-sectional view of an alternative transducer;

Figs. 6, 7 and 8 are fragmentary, sectional views illustrating further embodiments; and Figs. 9 and 10 are perspective views, partially broken away and sectioned on a plane through the axis of symmetry, and schematically showing generally circular embodiments of the arrangements of Figs. 2 and 3, respectively.

Briefly stated, my invention contemplates sonic transducer constructions, particularly underwater transducer constructions, in which R can be largely radiative and can be comparable to $\omega M$ in magnitude for a wide frequency range, and in which the stiffness can be negligible. In order to achieve these results, I employ a low-mass active element at the interface between two media having preferably very substantially different acoustical impedances. One of these media may have the same acoustic impedance as the medium in which the transducer is to be employed. The active element may be electrically conductive and supported in a magnetic field, as in a magnetic-flux gap.

An appreciation of this principle of operation may be obtained from a theoretical approach, in which one considers the behavior of a sound wave traveling in a medium of acoustic resistance $\rho_1 C_1$ and impinging normally on the surface of the medium $\rho_2 C_2$ (see Fig. 1), where $\rho_2 C_2$ is very much smaller than $\rho_1 C_1$. The symbol $\rho$ represents the density of the medium and the symbol C represents the velocity of propagation of sound in that medium. $\rho C$ represents the specific acoustical resistance of the medium. This is set forth in "Elements of Acoustical Engineering" by H. F. Olson, D. Van Nostrand, 1947, page 8. The mathematical discussion which follows is somewhat similar to the treatment given by Olson in that treatise on pages 114-119 thereof. The interface between media is identified by the reference numeral 9. If $P_1$ is the acoustic pressure amplitude of the incident wave, $P_1'$ the pressure amplitude of the reflected wave, and $P_2$ the transmitted pressure amplitude, and $V_1$, $V_1'$, and $V_2$ the corresponding acoustic volume currents (related to $\dot{v}$ of Equation 1), then the following relationships may be deduced:

$$P_2 = \frac{2P_1}{1+\frac{\rho_1 C_1}{\rho_2 C_2}} \quad (2)$$

$$V_2 = \frac{2V_1}{1+\frac{\rho_2 C_2}{\rho_1 C_1}} \quad (3)$$

$$P_1' = \frac{1}{2}P_2\left(1-\frac{\rho_1 C_1}{\rho_2 C_2}\right) \quad (4)$$

$$V_1' = \frac{1}{2}V_2\left(\frac{\rho_2 C_2}{\rho_1 C_1}-1\right) \quad (5)$$

If the medium 1 is water, $\rho_1 C_1$ is $1.5 \times 10^5$ acoustic ohms. If the medium 2 is air-cell rubber or rubber-like material, for which $\rho_2$ is approximately 0.3, then $\rho_2 C_2$ is approximately equivalent to the acoustic resistance of air, i.e., approximately 40 acoustic ohms, and $\rho_1 C_1$ is about 3800 times as large as $\rho_2 C_2$. Under such conditions, Equation 2 states that $P_2$, the pressure at the boundary, is very small as compared with the pressure $P_1$ in the impinging wave at a distance (a quarter wavelength or more) from the interface or boundary between the two media. Equation 3 shows that the motion $V_2$ in the boundary 9 is twice the motion associated with the incoming wave at a distance. Equation 4 shows that the pressure $P_1'$ in the reflected wave at a distance is very much larger than the transmitted pressure, and is is very much larger than the transmitted pressure, and is opposite in phase. From Equations 2 and 4, $P_1'$ is seen to be approximately equal to $P_1$ and opposite in sign. Finally, according to Equation 5, $V_1'$, the reflected current, is approximately one half as large as $V_2$, the current at the boundary, and is opposite in phase.

Equation 4 can be further interpreted to mean that, if the transducer exerts force on the boundary 9 (or creates force in this boundary), then the pressure $P_2$ encountered by this radiating transducer face is transformed by the factor $$\frac{1}{2}\left(1-\frac{\rho_1 C_1}{\rho_2 C_2}\right)$$

to the larger radiated pressure $P_1'$. The velocity transformation (Equation 5) may always be characterized by a factor of approximately 2.

In Fig. 2 of the drawings, I show a first embodiment of the invention in connection with a transducer which may have an effectively flat, rectangularly shaped, active surface of desired proportions. In this arrangement, the active element is a conductive strip 10, supported between adjacent parallel bar magnets 11; strips 10 and bar magnets 11 may be provided in plurality, in an array convenient to the desired overall proportions. The bar magnets 11 may be of so-called Alnico V material and permanently magnetized so that magnetic-flux gaps are established between adjacent opposed poles of adjacent bar magnets, as at the gap 12.

As explained above, I prefer that the active strips 10 be supported at the interface between two media having substantially different acoustic impedances, and in the form shown I have provided plugs 13 of sound-attenuating material, such as air-filled rubber-like material, between adjacent poles of each gap 12. The plugs or inserts 13 may derive lateral support from adjacent sides of adjacent bar magnets 11, and the conductive strips 10 may be bonded to the sound-attenuating material 13 so as to maintain sufficient insulated clearance with the adjacent poles of the gap.

On the other side of the active strips 10, the medium is preferably sound-transmitting, that is, in the medium in which the transducer is to be employed. For the underwater embodiment shown, I have provided a chamber 14 filled with a fluid having substantially the acoustic impedance of water and confined by means of an external sheath 15 of rubber-like material which is also preferably transparent to underwater acoustic energy. Sufficient rigidity may be lent to the flexible sheath 15 by the employment of reinforcement members 16 at convenient spacings.

To provide a rigid base for the support of the array of bar magnets 11, I have shown a metallic plate 17, grooved at spaced locations 18, to locate the various inserts of sound-attenuating material 13. For a reason which will be made clear, the bar magnets may be supported in slightly spaced and insulated relation with respect to the plate member 17, as by employment of gaskets 19 of insulating material. A ferromagnetic backing plate 20 may be secured to the plate member 17 for purposes of assuring a magnetic-return circuit, as suggested by the phantom outlines 21 at one end of Fig. 2.

Each active element 10 may be a single copper strip, or, if necessary, to reduce eddy-current losses, each strip may be a laminated build-up of a plurality of bonded strips, as suggested at 35 in Fig. 5. Electrical connections to the strips 10 may be accomplished by placing all strips 10 in parallel, as by connecting one end of all strips to one pole and the other end of all strips to the other pole. However, this would make for unduly low electrical impedance, and I, therefore, prefer the series connection of all strips 10, as illustrated in Fig. 2. If one assumes that Fig. 2 is a cross-sectional view of a vertical array of magnets 11 and strips 10, then these elements 10—11 will have upper ends (above the plane of the drawing) and lower ends (below the plane of the drawing); I have schematically shown electrical connections at 22 (solid lines) for the lower ends, and at 23 (dotted lines) for the upper ends of these elements. Thus, a series connection of strips 10 may involve a short connection 22 between the bottom of the leftmost bar magnet 11 and the bottom of the adjacent and leftmost strip 10, a short connection 23 between the top of said leftmost strip 10 and the top of the next adjacent bar magnet 11, and so on, the insulated bar magnets serving as "return conductors" to facilitate series connection of strips 10.

In Fig. 3, I show a slightly modified construction in which horseshoe rather than bar magnets are employed. In the arrangement shown, pole pieces 25—26 on each of a plurality of horseshoe magnets 27 define gaps between each other; further gaps are defined between adjacent pole pieces 26—25 of adjacent horseshoe magnets. In an array, the horseshoe magnets may be relatively long, thus appearing as elongataed channels. Frame members 28—29 may be secured to each other and embrace the horseshoe magnets 27 for locating purposes, and the entire assembly may be secured by bolts 30 to a backing plate 31. Aside from the specific construction of the magnets, the transducer of Fig. 3 may resemble that of Fig. 2, and I have therefore applied the same reference numerals to indicate the active strips 10 supported on sound-attenuating material 13 and flooded with sound-transmitting medium 14 behind an acoustic window 15. As distinguished from Fig. 2, there is in Fig. 3 a reversal of polarity from one magnetic gap to the next adjacent gap. Currents induced in adjacent strips 10 of Fig. 3 will therefore be in opposite directions, and the preferred electrical series connection of strips 10 may be simply effected without the need for "return conductors." Thus, short connections 24 (solid lines) may interconnect every other adjacent bottom end of strips 10, and short connections 24' (dotted lines) may interconnect every even adjacent top end of strips 10.

As indicated generally above, either of the constructions of Figs. 2 and 3 is suitable for constructing large square or rectangular panels, depending upon the desired application and characteristics. These constructions are also useful in cylindrical arrays, as illustrated schematically in Fig. 4, as, for example, when it is desired to have omnidirectional characteristics in a plane normal to the cylinder axis. In the cylindrical array of Fig. 4, the frame member 17' is an externally grooved annulus, the grooves serving to locate angularly spaced, longitudinally extending, sound-attenuating blocks 13' supporting the active strips 10'. The bar magnets 11' may be spaced from the frame member 17' by insulating means 19', and the entire assembly may be loosely encased in an acoustically transparent boot 15', so as to define a chamber 14' to be freely flooded with a sound-transmitting fluid, such as oil. Electrical connections may follow the pattern illustrated and described in connection with Fig. 2 but not shown in Fig. 4.

As pointed out previously, the acoustic impedance of air-filled rubber at atmospheric pressure is approximately 3800 times less than the acoustic impedance of water. At 600-ft. water depth, this ratio is reduced to approximately 200. This change in the impedance ratio need not appreciably affect the mechanics of the device, and hence its performance need not be seriously impaired at moderate depths in water. However, in designing for extreme-depth operation, it is important that the magnet thicknesses (and active gap depths) should be adequate to allow for the compression of the air cell rubber. Thus, for an assumed transducer having magnets 1-in. wide by ⅜-in. thick, and laminated strips ⁷⁄₁₆-in. wide by 0.025-in. thick, the active strips might lie approximately 2 mm. below the outer surfaces of the magnets at atmospheric pressure, and at maximum depths the strips might lie approximately 2 mm. above the back surfaces of the magnets.

If the present transducers are to be used as high-power projectors, the strips may need to carry currents in the order of 100 amperes per centimeter of width, and hence exert pressures in the orders of $10^5$ dynes/cm². Heavy leads and an appropriately large transformer may deliver such currents, and power output may be in the order of 1 to 10 kilowatts per square meter of transducer face throughout the audio range. If, on the other hand, the transducers are to be used as receivers, relatively small transformers can be employed, but the construction of the actual transducer may advantageously be left unchanged.

In Fig. 5, I show an alternative transducer construction, making use again of the principle of mounting the sensitive elements at the interface between two media having substantially different acoustical impedances. In the arrangement of Fig. 5, however, the sensitive elements 35 are mounted upon the sound-transmitting material and not on the sound-attenuating means. Thus, the sound-transmitting medium may comprise the outer protective window or sheath 36 of acoustically transparent rubber or rubber-like material; window 36 may be formed with projecting portions 37 extending into the gaps between adjacent bar magnets 38, so as to place the sensitive elements 35 generally centrally of the gaps. The sensitive strips 35 may be of laminated construction and may be bonded to the projecting window portions 37. As in the arrangement of Fig. 2, the bar magnets 38 may be supported by frame pieces 39 with an insulating layer 40 separating the magnets from the frame. The sound-attenuating medium may fill a rather extensive reservoir 41 on the back side of the sensitive strips 35, and this reservoir may be air-filled. Communication with this reservoir is preferably free and open, and therefore I have provided rather substantial openings or slots 42 between adjacent frame parts 39 supporting the bar magnets.

If desired, the transducer of Fig. 5 may be self-compensating for depth by providing a flexible sheath 43 on the back side of the chamber or reservoir 41. The back-side of sheath 43 may be freely flooded with the medium 44 in which the transducer is to respond, and for this purpose, I have shown a flooding aperture 45 in a protective outside cover 46. As in the case of the arrangement of Fig. 2, electrical connections (not shown) may be made to the sensitive strips 35 and to the adjacent bar magnets 38; alternatively, the magnets may be left uninsulated, and insulated copper "return-conductor" strips may be bonded to the tops (fronts) of the magnets, thus eliminating minor detrimental characteristics resulting from the Hall effect of the magnets, all as will be more fully disclosed in connection with Fig. 7 below.

It will be appreciated that, if the air-reservoir volume 41 is sufficiently large, as compared with the active volumes, the operating position of the active strips 35 in the flux gaps may be substantially independent of operating depth, and the characteristics of the device will be more independent of operating depth than any of the previously described constructions. In use under water, the back side will generally be inactive so that the device will be essentially unidirectional, as in the case of the forms of Figs. 2 and 3.

It will be appreciated that the present transducers may be used in air as high-power, direct-radiating loud speakers, or for rugged directional outdoor microphones. When used in air, however, the impedance-transformation mechanism discussed above will be invalid, and the efficiency and power-handling capacity will not be as high as when used under water.

When operation in air is specifically intended, the construction may be simplified and made more suitable for that application. Thus simplified, one form of the device is shown in Fig. 6. In the arrangement of Fig. 6, the sensitive strips 50 are supported from projecting corrugations 51 on a radiating diaphragm 52. The diaphragm 52 may be of a thin, relatively stiff, light, plastic-impregnated material. Such materials lend themselves to ribbed or corrugated formations, as shown, and permit bonding to the magnets 53 and to the sensitive strips 50; such construction may provide maximum flexibility for movement in the forward and backward directions, and maximum stiffness against lateral displacement. Relatively light frame members 54 may again be insulated, as at 55, from the bar magnets, and a back cover 56 may be spaced well behind the frame members 54, in order to provide an extensive air chamber or reservoir 57. Again, air-leak slots 58 between bar magnets and the frame members 54 may be provided to increase the compliance of the space underneath (or behind) the active strips 50. The back cover 56 will promote unidirectional radiation or sensitivity, but this cover may be omitted if a back response is desired. As in the case of the other described forms, a transducer according to Fig. 6 may be made in the form of large panels for loudspeaker or microphone applications.

Figs. 7 and 8 show alternative constructions for the general organization of Fig. 6. In Fig. 7, the diaphragm 52' is again bonded to the magnets 53' and to the sensitive strips 50', but electrical "return-conductor" strips 60 are bonded to the diaphragm adjacent the bar magnets 53' to provide the electric return path. In such case, the bar magnets 53' may be mounted directly, that is, without insulation, on the frame members 54', and electrical connections may be made to the strips 60 and 50'.

In Fig. 8, I show a slight modification of the diaphragm construction in order that a complete assembly may have a minimum front-to-back thickness. In the arrangement of Fig. 8, spacer members 62, which may be of plastic construction, are bonded or otherwise supported by the bar magnets 63, and the diaphragm 64 is supported on spacers 62 in essentially one plane. With such construction, the diaphragm projections 65 for supporting the active strips 66 may be of minimum extent. Electrical connections (not shown) may be as described for Fig. 2.

In Figs. 9 and 10, I illustrate generally circular or arcuate embodiments of the arrangements of Figs. 2 and 3, respectively. In both cases, generally circular or arcuate magnet elements are radially spaced to define annular magnetic-flux gaps, and the conducting strips are generally circular or arcuate. In Fig. 9, a concentric array of magnetized rings 70—71—72 is arranged in a series-magnetic circuit, with a suitably formed ferromagnetic means 74 to close the magnetic circuit. A frame member 75 of non-magnetic material may be embraced by ferromagnetic means 74 and may support all magnet rings 70—71—72. Electrical-conducting means 76—77 may be supported in the annular flux gaps between rings 70—71—72, and each of these is circumferentially discontinuous, as indicated by the single break 78 in each conductor. Heavy solid lines 79—80 schematically indicate an electrical interconnection of the active elements. As in previously described embodiments, air-filled rubber or the like inserts 81 may support the strips 76—77.

In Fig. 10, the circular form of a parallel magnetic circuit is illustrated. The magnetic-flux gaps are again annular, but they are defined between annular horseshoe magnets and between the poles of each such magnet. Thus, a first annular gap may be defined between the poles 85—86 of a first annular magnet 87; a second annular gap may be defined between the poles 88—89 of a second annular magnet 90, and a third annular gap may be defined between adjacent poles 86—88 of the adjacent magnets 87—90. A backing plate 91 may hold the magnets together. Arcuate conductor strips 92—93—94 may be supported in the gaps on air-filled rubber inserts (not shown), and a series electrical connection of the strips is schematically indicated by leads 95 and jumpers 96.

It will be seen that I have described novel acousto-electric and electro-acoustic transducer means applicable to air and water use. The construction provides especially advantageous underwater features, including great power-handling capacity over a relatively broad frequency band. The basic construction is relatively simple and lends itself to arrays of almost any desired configuration.

While I have described my invention in detail for the preferred forms shown, it will be understood that modifications may be made within the scope of the invention, as defined in the following claims.

I claim:

1. An electromagnetic transducer, comprising housing means, means including a first medium having substantially the sound-transmitting properties of water and contained by said housing means and defining an acoustic-response face on one side of said housing means, a second medium within said housing means, said second medium being adjacent said first medium behind said face and having substantially the sound-transmitting properties of air, an array of spaced magnets and magnetic-flux gaps within said transducer and behind said face, and metallic conducting strips yieldably supported in the magnetic fields of said gaps, said strips being in direct driving relation with said first medium at the interface between said media.

2. A transducer according to claim 1, in which said array of magnets and said interface lie substantially in a single plane.

3. A transducer according to claim 1, in which said magnets and said interface lie substantially in the surface of a cylinder.

4. A transducer according to claim 1, in which said magnets are substantially parallel to each other.

5. In a transducer of the character indicated, an array of substantially parallel bar magnets with magnetic-flux gaps therebetween, metallic conducting strips yieldably supported in the magnetic fields of said gaps and mechanically essentially free of said bar magnets, and electrical connections to said strips and to said bar magnets, whereby an electric circuit may be established through a bar magnet and an adjacent strip.

6. A transducer according to claim 5, in which said magnets serve as return conductors in a series electrical interconnection of said strips.

7. In a transducer of the character indicated, magnet means having a gap traversed by magnetic flux, a metallic conducting strip spanning said gap, a sound-transmitting material on one side of said strip and supporting said strip in said gap, and a sound-attenuating medium on the other side of said strip.

8. In a transducer of the character indicated, magnet means including spaced poles defining a magnetic-flux gap, a strip of conducting material in said gap, and flexible diaphragm means carried by said poles and flexibly supporting said strip in said gap.

9. In an underwater transducer or the like, magnet means including spaced pole pieces defining a magnetic-flux gap, a conducting metallic strip in said gap, underwater sound-absorbing means spanning said pole pieces and supporting one side of said strip in said gap, an underwater sound-transmitting sheet supported in spaced relation with the other side of said strip and spanning said poles, and a sound-transmitting fluid between said sheet and the other side of said strip.

10. A device according to claim 9, in which said sound-attenuating means is air-filled, rubber-like material.

11. A device according to claim 9, in which said sound-transmitting fluid is oil.

12. In an underwater transducer or the like, magnet means including spaced poles defining a magnetic-flux gap, a sound-transmitting flexible resilient sheath abutting said poles and including a portion projecting partially into said gap, a conducting metallic strip carried by said projecting portion so as to be supported in said gap, and a gas filled chamber on the side of said strip away from said resilient sheath, whereby said strip may be supported at the interface between media having two substantially different acoustic impedances.

13. A device according to claim 12, in which said chamber is defined by a further flexible sheath spaced from said poles and from said strip.

14. A device according to claim 13, in which a frame member of relatively non-resilient material is outside said further sheath, said frame member having an opening therein, whereby the space between said frame member and said further sheath may be flooded with the medium in which said transducer is to operate.

15. A device according to claim 13, in which said further flexible sheath is substantially parallel to the radiating face constituted by said metallic strip and said poles.

16. In a transducer of the character indicated, magnetic means having a gap traversed by magnetic flux, a metallic conducting strip located in the field of said gap, a medium having substantially the sound-transmitting properties of water on one side of said strip and in intimate contact with said one side, and a medium having substantially the sound-transmitting properties of air on the other side of said strip and in intimate contact with said other side.

17. In an underwater transducer or the like, magnet means including spaced poles defining a magnetic-flux gap, underwater sound-transmitting means spanning said poles at one side of said gap, underwater sound-absorbing means spanning said poles at the other side of said gap and including a portion projecting partially into said gap, a conductive metallic strip carried by said projecting portion so as to be supported in said gap, whereby said strip may be supported at the interface between media having two substantially different acoustic impedances.

18. In an underwater transducer or the like, magnet means including spaced poles defining a magnetic-flux gap, underwater-sound-transmitting means spanning said poles on one side thereof, underwater-sound-absorbing means spanning said poles on the other side of said gap, and a conductive metallic strip supported in said gap by one of said transmitting and absorbing means.

19. In a transducer of the character indicated, a support, magnetic means on said support having a gap traversed by magnetic flux, a metallic conducting strip in said gap, a sound-transmitting material carried by said support on that side of said strip directed toward the medium in which said transducer is adapted to be immersed and interposed between said strip and said medium, a sound-attenuating material on the other side of said strip, one of said materials supporting said strip in said gap.

20. The transducer of claim 19, in which said sound-transmitting material supports said strip in said gap.

21. The transducer of claim 19, in which said sound-attenuating material supports said strip in said gap.

22. In a transducer of the character indicated, a support, a horseshoe magnet on said support including spaced pole pieces defining between themselves a gap traversed by magnetic flux, a metallic conducting strip in said gap, sound-transmitting material carried by said support on that side of said strip directed toward the medium in which said transducer is adapted to be immersed and interposed between said strip and said medium, and sound-attenuating means between said pole pieces on the other side of said strip and supporting said strip in said gap.

References Cited in the file of this patent
UNITED STATES PATENTS

| | | |
|---|---|---|
| 1,333,298 | Evershed et al. | Mar. 9, 1920 |
| 1,604,532 | Riegger | Oct. 26, 1926 |
| 1,637,397 | Sykes | Aug. 2, 1927 |
| 1,674,683 | Hahnemann | June 26, 1928 |
| 1,827,919 | Van Wagenen | Oct. 20, 1931 |
| 2,293,372 | Vasilach | Aug. 18, 1942 |
| 2,429,104 | Olson | Oct. 14, 1947 |
| 2,496,484 | Massa | Feb. 7, 1950 |
| 2,643,367 | Cruzan | June 23, 1953 |